United States Patent
Matsumoto

(10) Patent No.: US 9,228,638 B2
(45) Date of Patent: Jan. 5, 2016

(54) SHIFT DRIVE MECHANISM FOR MULTI-SPEED TRANSMISSION

(71) Applicant: HONDA MOTOR CO., LTD., Tokyo (JP)

(72) Inventor: Shinya Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 93 days.

(21) Appl. No.: 13/962,329

(22) Filed: Aug. 8, 2013

(65) Prior Publication Data

US 2014/0053671 A1 Feb. 27, 2014

(30) Foreign Application Priority Data

Aug. 23, 2012 (JP) ................................. 2012-184478

(51) Int. Cl.
| | |
|---|---|
| *F16H 59/00* | (2006.01) |
| *F16H 3/08* | (2006.01) |
| *F16H 3/083* | (2006.01) |
| *F16H 63/30* | (2006.01) |

(52) U.S. Cl.
CPC .................. *F16H 3/08* (2013.01); *F16H 3/083* (2013.01); *F16H 2063/3096* (2013.01); *Y10T 74/19251* (2015.01)

(58) Field of Classification Search
CPC ............ F16H 3/08; F16H 3/089; F16H 3/006
USPC .......................................... 74/333, 335, 337.5
See application file for complete search history.

(56) References Cited

U.S. PATENT DOCUMENTS

| | | | | |
|---|---|---|---|---|
| 3,274,843 | A * | 9/1966 | Luebkemann | 74/335 |
| 5,150,637 | A * | 9/1992 | Ninomiya et al. | 74/335 |
| 6,439,075 | B1 * | 8/2002 | Koyama et al. | 74/473.36 |
| 6,595,078 | B2 * | 7/2003 | Arakawa | 74/337.5 |
| 7,600,446 | B2 * | 10/2009 | Mizuno et al. | 74/473.1 |
| 8,215,196 | B2 * | 7/2012 | Buck et al. | 74/335 |
| 8,250,939 | B2 * | 8/2012 | Hayakawa et al. | 74/335 |
| 8,286,523 | B2 * | 10/2012 | Hayakawa et al. | 74/335 |
| 8,387,477 | B2 * | 3/2013 | Ieda et al. | 74/335 |
| 8,505,403 | B2 * | 8/2013 | Bowen et al. | 74/335 |
| 2001/0025535 | A1 * | 10/2001 | Kamiya | 74/335 |

(Continued)

FOREIGN PATENT DOCUMENTS

| | | |
|---|---|---|
| JP | 2008-151275 | 7/2008 |
| JP | 2010-078050 | 4/2010 |

*Primary Examiner* — William Kelleher
*Assistant Examiner* — Zakaria Elahmadi
(74) *Attorney, Agent, or Firm* — Rankin, Hill & Clark LLP

(57) ABSTRACT

A shift drive mechanism in which a special constant-meshing-type multi-speed transmission can be applied to a transmission case of a constant-meshing-type multi-speed transmission of a general type. In a shift drive mechanism of a multi-speed transmission where the transmission is configured such that a control rod is movable in the axial direction on a hollow-shaft center axis of a gear shaft formed in a hollow shape so that an engagement changeover mechanism is driven to perform a gear shift, and a shift pin, which is guided by a shift drum provided near a periphery of the gear shaft, moves the control rod in the axial direction, an intermittent drive mechanism intermittently rotates the shift drum for every position of each gear speed by transmitting the reciprocating rotation of a shift spindle, which is connected to a gear shift operating member, is arranged between the shift spindle and the shift drum.

16 Claims, 7 Drawing Sheets

(56) References Cited

U.S. PATENT DOCUMENTS

| | | | |
|---|---|---|---|
| 2002/0062703 A1* | 5/2002 | Arakawa | 74/337.5 |
| 2002/0144564 A1* | 10/2002 | Luh | 74/337.5 |
| 2009/0008206 A1* | 1/2009 | Bowen | 192/48.2 |
| 2010/0071492 A1* | 3/2010 | Matsumoto | 74/337.5 |
| 2010/0071493 A1* | 3/2010 | Matsumoto | 74/337.5 |
| 2010/0218630 A1* | 9/2010 | Matsumoto et al. | 74/333 |
| 2011/0023639 A1* | 2/2011 | Matsumoto | 74/337.5 |
| 2011/0252920 A1* | 10/2011 | Bowen et al. | 74/665 F |
| 2012/0152046 A1* | 6/2012 | Matsumoto et al. | 74/333 |
| 2012/0240702 A1* | 9/2012 | Tokito | 74/337.5 |
| 2013/0239717 A1* | 9/2013 | Bowen et al. | 74/335 |

* cited by examiner

SHIFT DRIVE MECHANISM FOR MULTI-SPEED TRANSMISSION

BACKGROUND OF THE INVENTION

1. Field of the Invention

The present invention relates to a constant-meshing-type multi-speed transmission.

2. Description of Related Art

In a constant-meshing-type multi-speed transmission where drive gears on a main gear shaft and driven gears on a counter gear shaft are in a constant meshing state for every gear speed, in general, the gear shift is performed in such a manner that, when a shift pedal is operated, a dog clutch is moved in the axial direction so that the meshing of gears which effectively transmit power from a main gear shaft to a counter gear shaft is selected (see JP-A-2008-151275, for example).

In the case of the constant-meshing-type multi-speed transmission of a general type described in JP-A-2008-151275, due to the rotation of a shift spindle driven in response to a shift operation of a shift pedal, a shift drum is rotated by way of an intermittent drive mechanism, a shift fork is axially moved by being guided by a shift guide groove formed on an outer peripheral surface of the shift drum, and the shift fork moves a shifter gear and a shifter provided with a dog clutch mechanism on the main gear shaft and the counter gear shaft in the axial direction thus performing the gear shift.

Accordingly, the relatively large shift fork moving mechanism is interposed between the shift spindle and the counter gear shaft (and the main gear shaft) positioned on a lower side of the transmission and hence, the shift spindle and the counter gear shaft (and the main gear shaft) are largely spaced apart from each other. A transmission case rotatably supports the shift spindle and the counter gear shaft (and the main gear shaft) which are spaced apart from each other in such a manner.

On the other hand, with respect to the constant-meshing-type multi-speed transmission, there has been known a special multi-speed transmission where either the main gear shaft or the counter gear shaft rotatably supports gears in a relatively rotatable manner, and a control rod which moves axially in the inside of the gear shaft selectively operates engaging members arranged in the inside of the gear shaft so as to make a desired gear engage with the gear shaft thus establishing a gear speed. The applicant of this application previously filed the patent application on this special constant-meshing-type multi-speed transmission (see JP-A-2010-78050).

In the case of the special constant-meshing-type multi-speed transmission described in JP-A-2010-78050, a shift drum is provided adjacent to an end portion of the counter gear shaft in which the control rod passes through, and a small shift pin, which engages with the end portion of the control rod, is guided by a shift guide groove formed on the shift drum, and a gear shift is performed by the axial movement of the control rod.

Due to such a constitution, a relatively large shift fork moving mechanism such as one disclosed in JP-A-2008-151275 is unnecessary and hence, the miniaturization and reduction in weight of the multi-speed transmission can be realized.

SUMMARY OF THE INVENTION

The constitution where a power unit provided with a transmission case constituting a part of the constant-meshing-type multi-speed transmission of a general type has been adopted in general up to now so that if the special constant-meshing-type multi-speed transmission described in JP-A-2010-78050 is also applicable to this same transmission case, then this transmission case can be used as it is without changing the constitution of a vehicle and thereby manufacturing cost can be largely reduced.

However, with respect to the transmission case of the constant-meshing-type multi-speed transmission of a general type, as described above, there has been a case where the shift spindle and the counter gear shaft (and the main gear shaft) are rotatably supported in such a manner that the shift spindle and the counter gear shaft (and the main gear shaft) are largely spaced apart from each other. To apply the special constant-meshing-type multi-speed transmission having the shift drum arranged adjacent to the end portion of the counter gear shaft to this transmission case, the constitution of the shift drive system, which intermittently transmits power from the shift spindle that is rotated manually to the shift drum arranged adjacent to the counter gear shaft becomes important. However, the structure of the shift drive system is not disclosed clearly in JP-A-2010-78050.

The invention has been made in view of the above, and it is an object of the invention to provide a shift drive mechanism where a special constant-meshing-type multi-speed transmission can be applied to a transmission case of a constant-meshing-type multi-speed transmission of a general type.

In accordance with the present invention, a shift drive mechanism of a multi-speed transmission, where the transmission is configured such that:

a group of gears formed of a plurality of drive gears and a group of gears formed of a plurality of driven gears are rotatably supported on gear shafts arranged parallel to each other respectively in such a state where the drive gears and the driven gears are meshed with each other for every gear speed, one group of gears formed of the plurality of gears out of the group of gears formed of the plurality of drive gears and the group of gears formed of the plurality of driven gears is fixed to one gear shaft, and an engagement changeover mechanism, which changes over the engagement between the other gear shaft and the respective gears for every gear is provided between the other group of gears formed of the plurality of gears and the other gear shaft, and a control rod is movable in the axial direction on a hollow-shaft center axis of the other gear shaft formed in a hollow shape so that the engagement changeover mechanism is driven whereby a gear shift is performed, and a shift pin, which is engaged with a shift guide groove formed on an outer periphery of a shift drum arranged in the vicinity of a periphery of the other gear shaft and is guided due to the rotation of the shift drum, moves the control rod in the axial direction, wherein an intermittent drive mechanism, which intermittently rotates the shift drum for every position of each gear speed by transmitting the reciprocating rotation of a shift spindle, which is connected to a gear shift operating member, is arranged between the shift spindle and the shift drum.

Since the intermittent drive mechanism is arranged between the shift spindle and the shift drum, the shift spindle and the shift drum can be suitably spaced apart from each other. Accordingly, the special constant-meshing-type multi-speed transmission where the shift drum is arranged in the vicinity of the periphery of the counter gear shaft (and the main gear shaft) which is spaced apart from the shift spindle can be easily applied to a transmission case of a constant-meshing-type multi-speed transmission of a general type where a shift spindle which is positioned on a lower side of a general type and a counter gear shaft (a the main gear shaft) arranged above the shift spindle are rotatably supported in a relatively largely spaced-apart manner.

Further, the intermittent drive mechanism, which intermittently transmits the rotation of the shift spindle to the shift drum for each gear speed, can be easily arranged by making use of a space formed between the shift spindle and the counter gear shaft (and the main gear shaft).

In further accordance with the invention, the intermittent drive mechanism, which transmits power only during the outgoing rotation to a downstream-side rotary member with respect to the reciprocating rotation of an upstream-side rotary member, is provided between the shift spindle and the shift drum, and the rotation of a downstream-member-side drive gear, which is formed integrally with the downstream-side rotary member, is transmitted to a drum-side driven gear, which is integrally formed on the shift drum, due to the meshing of the gears. Due to such a constitution, by arranging the intermittent drive mechanism between the shift spindle and the shift drum thus interposing the gear system which transmits power to the drum-side driven gear from the downstream-member-side drive gear, the intermittent drive mechanism can be properly positioned also in the transmission case in which the shift spindle and the counter gear shaft (and the main gear shaft) are rotatably supported in a relatively largely spaced-apart manner and hence, the shift spindle and the shift drum can be easily arranged.

In further accordance with the invention, the intermittent drive mechanism includes a detent mechanism where a flower-shaped cam is coaxially and integrally formed with the downstream-side rotary member, and the flower-shaped cam is positioned and held at the predetermined rotational position together with the downstream-side rotary member by pushing a roller by a biasing device toward a predetermined uneven cam surface of the flower-shaped cam where a plurality of detent recessed portions are sequentially formed on the uneven cam surface in the circumferential direction. Accordingly, the rotation of the shift spindle can be intermittently transmitted to the shift drum so that the shift drum can be surely positioned for each gear speed.

In further accordance with the present invention, an intermediate gear is interposed between the downstream-member-side drive gear and the drum-side driven gear. Accordingly, the degree of freedom in position where the downstream-side rotary member, which is integrally formed with the downstream-member-side drive gear, and the intermittent drive mechanism is high so that the shift spindle and the shift drum can be more easily arranged also in the transmission case in which the shift spindle and the counter gear shaft (and the main gear shaft) are rotatably supported in a relatively largely spaced-apart manner.

In further accordance with the present invention, the shift drive mechanism includes a shift arm, which has a proximal end portion thereof fixedly mounted on the shift spindle and is tilted integrally with the shift spindle in a reciprocating manner, and the tilting distal end portion of the shift arm rotates the upstream-side rotary member. Accordingly, an amount of rotation of the upstream-side rotary member and an amount of rotation of the downstream-side rotary member generated by the tilting of the shift arm are determined so that an intermittent rotational amount of the shift drum to which the rotation is transmitted from the downstream-side rotary member by way of a gear system can be properly determined.

In further accordance with the present invention, the multi-speed transmission is housed in a transmission case, and the shift drum is rotatably supported on a holder side wall member, which is detachably mounted on the transmission case and forms a body separate from the transmission case, and the upstream-side rotary member and the downstream-side rotary member are coaxially and rotatably supported. Accordingly, a unit is formed by incorporating the shift drum and the intermittent drive mechanism into the holder side wall member so that these parts can be handled integrally thus enhancing assembling property.

In further accordance with the present invention, a connecting rod portion, which extends on a rotation center axis from the downstream-side rotary member rotatably supported on the holder side wall member, is coaxially joined to an operating shaft of a gear position sensor mounted on the transmission case. Accordingly, the transmission case has tolerance in space compared to the holder side wall member and hence, the gear position sensor can be easily arranged. The downstream-side rotary member, which is provided with the flower-shaped cam, which determines the rotational position by surely performing the intermittent driving is connected to the gear position sensor by way of the connecting rod portion, and the rotation of the downstream-side rotary member provided with the flower-shaped cam directly operates the gear position sensor and hence, the gear position can be properly and accurately detected.

In further accordance with the present invention, the intermediate gear is formed in a bolt shape where a head portion having an enlarged diameter is formed on an intermediate shaft portion, and a teeth portion is formed on an outer periphery of the head portion. The intermediate shaft portion is rotatably supported on the holder side wall member via a bearing. Accordingly, the intermediate gear can be arranged in a compact manner thus realizing the reduction in weight.

In further accordance with the present invention, a gear train where the downstream-member-side drive gear, the intermediate gear and the drum-side driven gear are meshed with each other sequentially is arranged along an outer surface of the holder side wall member; the flower-shaped cam is arranged outside the downstream-member-side drive gear in the axial direction; and, the roller, which is pushed to an uneven cam surface of the flower-shaped cam by the biasing device overlaps with the intermediate gear as viewed in the axial direction. Accordingly, the gear train constituted of the downstream-member-side drive gear, the intermediate gear and the drum-side driven gear is arranged along the outer surface of the holder side wall member, the flower-shaped cam is arranged outside the downstream-member-side drive gear, and the roller, which is pushed to the uneven cam surface of the flower-shaped cam, is positioned outside the intermediate gear and hence, the shift drive mechanism can be constituted in a compact manner.

BRIEF DESCRIPTION OF THE DRAWINGS

FIG. 4 is an exploded perspective view showing a state where a lost motion mechanism is assembled into a control rod, and also showing a cam rod and the like.

DETAILED DESCRIPTION OF THE PREFERRED EMBODIMENTS

Hereinafter, one embodiment of the invention is explained in conjunction with FIG. 1 to FIG. 7. A multi-speed transmission 10 according to this embodiment is configured such that the multi-speed transmission 10 is incorporated into a power unit mounted on a motorcycle together with an internal combustion engine. In this specification, "front", "rear", "left" and "right" are determined with reference to the vehicle.

Figure 1:
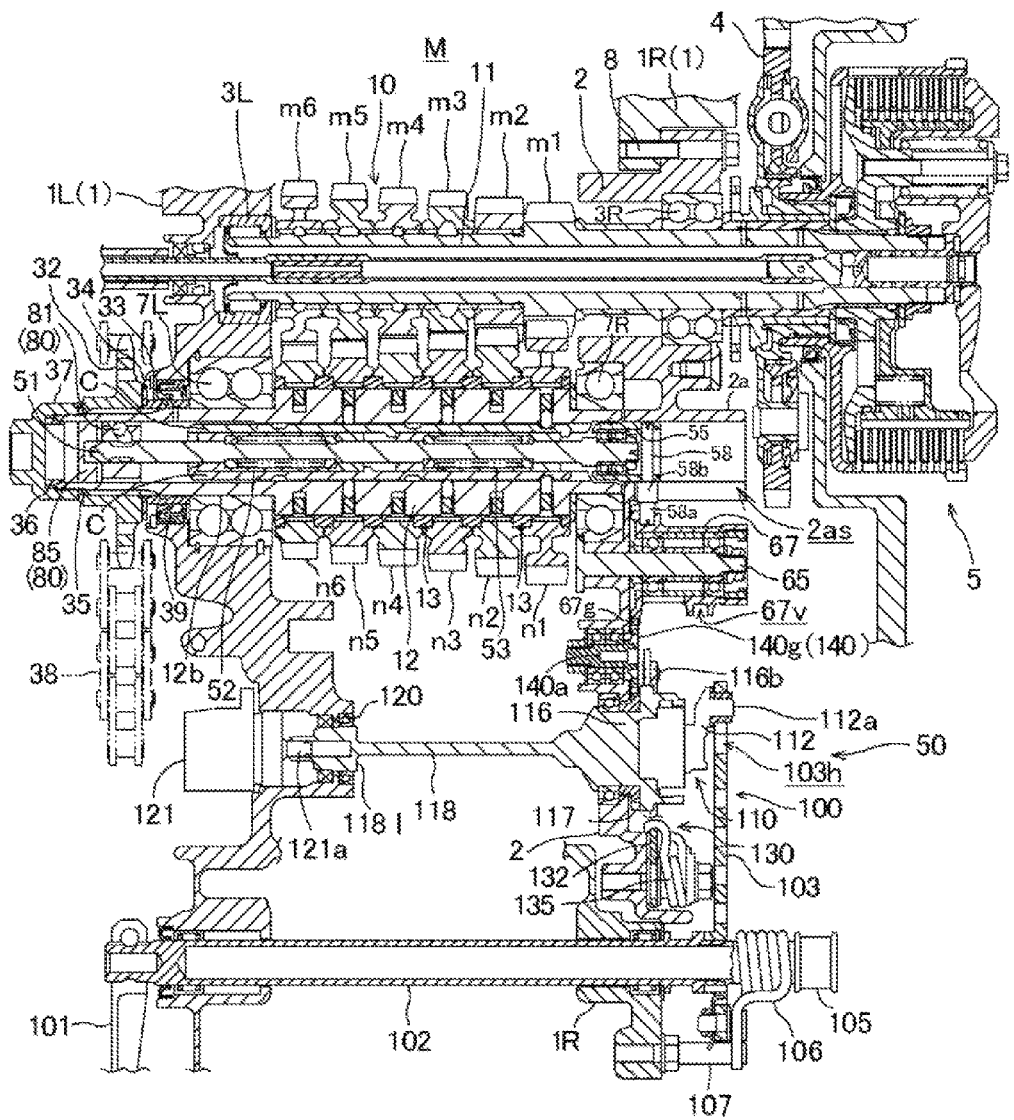
FIG. 1 is a cross-sectional view of a multi-speed transmission according to one embodiment of the invention.

FIG. 1 is a cross-sectional view of the multi-speed transmission 10. As shown in FIG. 1, the multi-speed transmission 10 is mounted on an engine case 1 that is used in common by the internal combustion engine so that the engine case also constitutes a transmission case.

In the engine case (transmission case) 1 constituted by merging a left engine case (left transmission case) 1L and a right engine case (right transmission case) 1R, which have the left and right split structure, a transmission chamber M is formed. A main gear shaft 11 and a counter gear shaft 12 are rotatably supported in the transmission chamber M such that the main gear shaft 11 and the counter gear shaft 12 are arranged parallel to each other and are directed in the lateral direction.

The main gear shaft 11 is rotatably supported on a side wall of the left engine case (left transmission case) 1L and a holder side wall member 2, which forms a body separate from the right engine case (right transmission case) 1R, by way of bearings 3L, 3R. A multi-disc-type friction clutch 5 is mounted on a right end portion of the main gear shaft 11, which passes through the right bearing 3R and projects from the transmission chamber M.

On a left side of the friction clutch 5, a primary driven gear 4 to which the rotation of a crankshaft 9 (see FIG. 5) is transmitted is rotatably supported on the main gear shaft 11.

The rotation of the crankshaft of the internal combustion engine is transmitted to the main gear shaft 11 from the primary driven gear 4 by way of the friction clutch 5 in an engaging state.

On the other hand, the counter gear shaft 12 is also rotatably supported on the side wall of the left engine case 1L and the holder side wall member 2 of the right engine case 1R by way of bearings 7L, 7R. A cylindrical collar member 33 is fitted on a left end portion of the counter gear shaft 12, which passes through the left bearing 7L and projects from the transmission chamber M, in a state where the collar member 33 is brought into contact with an inner race of the left bearing 7L. A plurality of supply oil introducing holes 12x are formed in a portion of the counter gear shaft 12 on which the collar member 33 is fitted in a penetrating manner in the radial direction. Introducing holes are also formed in the collar member 33 corresponding to the supply oil introducing holes 12x, and an outer periphery of the collar member 33 is covered with an annular sealing member 39.

An output sprocket 32 is mounted on the counter gear shaft 12 by spline fitting in a state where a disc spring 34 is sandwiched between the output sprocket 32 and the collar member 33. The output sprocket 32 is pushed from the outside by a cap nut 37, which is threadedly engaged with a shaft end of the counter gear shaft 12 by way of a spacer 35, in a state where an interposing member 36 is interposed between the cap nut 37 and the shaft end of the counter gear shaft 12.

A drive chain 38 is wound around the output sprocket 32 mounted in this manner, and the drive chain 38 is wound around a sprocket for driving a rear wheel disposed on a rear side (not shown) so that rotational power of the counter gear shaft 12 is transmitted to the rear wheel whereby the vehicle travels.

A group of drive shift gears m is mounted on the main gear shaft 11 between the left and right bearings 3L, 3R in a state where the group of drive shift gears m is integrally rotatable with the main gear shaft 11.

The first drive shift gear m1 is integrally formed with the main gear shaft 11 along the right bearing 3R, and the second, third, fourth, fifth and sixth drive shift gears m2, m3, m4, m5, m6 having diameters that are increased sequentially from the right to the left are engaged with splines formed on the main gear shaft 11 between the first drive shift gear m1 and the left bearing 3L by spline fitting.

On the other hand, a group of driven shift gears n is rotatably supported on the counter gear shaft 12 by way of annular bearing collar members 13 between the left and right bearings 7L, 7R.

Figure 2:
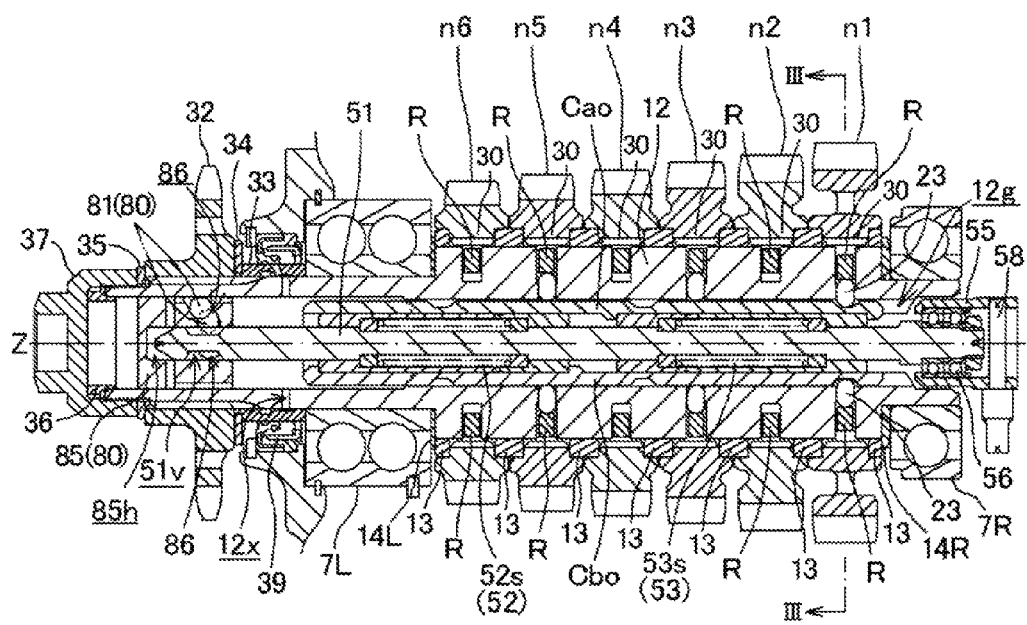
FIG. 2 is a cross-sectional view (cross-sectional view taken along a line II-II in FIG. 3) showing a counter gear shaft and the structure around the counter gear shaft.

To explain the structure in conjunction with FIG. 2, five bearing collar members 13 are exteriorly mounted on the counter gear shaft 12 at equal intervals between the bearing collar member 13 on a right end, which is exteriorly mounted on the counter gear shaft 12 by way of the collar member 14R interposed between a left side of the right bearing 7R and the bearing collar member 13 on a left end, which is exteriorly mounted on the counter gear shaft 12 by way of the collar member 14L interposed between a right side of the left bearing 7L and the bearing collar member 13. The first, second, third, fourth, fifth and sixth driven shift gears n1, n2, n3, n4, n5, n6, which sequentially decrease diameters thereof in order from the right to the left, are rotatably supported on the counter gear shaft 12 such that each shift gear straddles between the bearing collar members 13, 13 arranged adjacent to each other among seven bearing collar members 13 in total.

The first, second, third, fourth, fifth and sixth drive shift gears m1, m2, m3, m4, m5, m6, which are rotated integrally with the main gear shaft 11, are constantly meshed with the corresponding first, second, third, fourth, fifth and sixth driven shift gears n1, n2, n3, n4, n5, n6, which are rotatably supported on the counter gear shaft 12, respectively.

The meshing between the first drive shift gear m1 and the first driven shift gear n1 constitutes the first speed which exhibits the largest speed reduction ratio, the meshing between the sixth drive shift gear m6 and the sixth driven shift gear n6 constitutes the sixth speed which exhibits the smallest speed reduction ratio, and the second speed, the third speed, the fourth speed and the fifth speed are constituted between the first speed and the sixth speed such that the speed reduction ratio is sequentially decreased.

On the counter gear shaft 12, the odd-numbered gears (first, third and fifth driven shift gears n1, n3, n5) where the gear speed is the odd number and even-numbered gears (second, fourth and sixth driven shift gears n2, n4, n6) where the gear speed is the even number are alternately arranged.

An engaging device 20, which is engageable with respective driven shift gears n, is assembled into the counter gear shaft 12 having a hollow cylindrical shape as described later. Eight pieces (two pieces for each of four kinds) of cam rods C (Cao, Cao, Cae, Cae, Cbo, Cbo, Cbe, Cbe), which constitute one constitutional element of the engaging device 20 (described later), are axially movably arranged in the counter gear shaft 12 in a state where the cam rods C are fitted in 8 pieces of cam guide grooves 12g formed on a hollow inner peripheral surface of the counter gear shaft 12 in the circumferential direction (see FIG. 2, FIG. 3).

A control rod 51, which performs a gear shift by driving the cam rods C, is inserted into the hollow center shaft of the counter gear shaft 12. Movement of the control rod 51 in the axial direction moves the cam rods C in the axial direction in an interlocking manner by way of lost motion mechanisms 52, 53.

Figure 4:
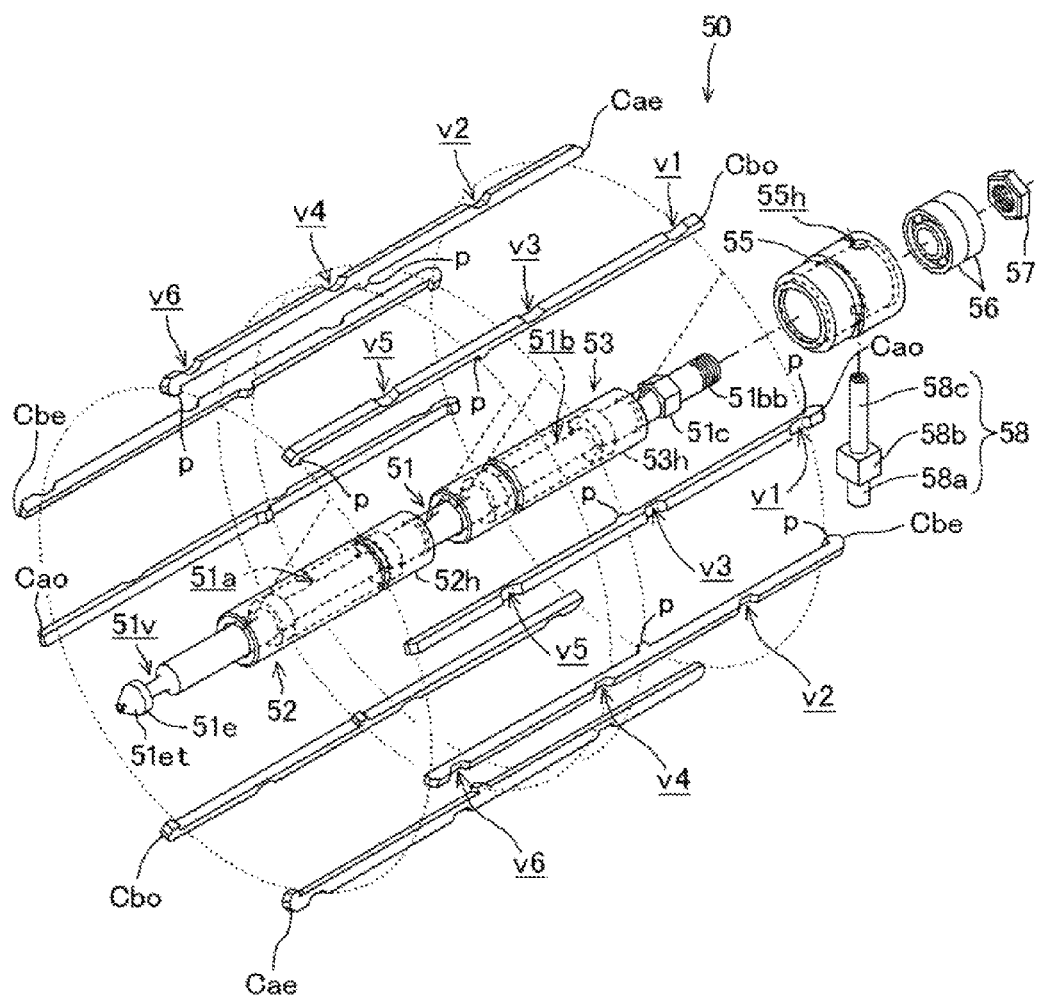

To explain the structure in conjunction with FIG. 4, the control rod 51 has a circular columnar rod shape. Outer peripheral recessed portions 51a, 51b having narrowed diameters respectively are formed on two left and right portions of the control rod 51 in the axial direction over a predetermined length respectively, and an outer peripheral recessed groove 51v having a narrow width is formed just behind a distal end portion 51e having a conically pointed tapered face 51et on a left end thereof.

A male threaded end portion 51bb on which male threads are formed is formed on a right end of the control rod 51, and a nut portion 51c, which has a hexagonal shape, is formed just behind the male threaded end portion 51bb.

The lost motion mechanisms 52, 53 are assembled to the control rod 51 corresponding to the left and right outer peripheral recessed portions 51a, 51b respectively.

The left and right lost motion mechanisms 52, 53 are provided by arranging the mechanism having the same structure in which a compressive coil spring is arranged on the left and right sides of the control rod 51.

Eight pieces of cam rods C (Cao, Cao, Cae, Cae, Cbo, Cbo, Cbe, Cbe) are arranged at radial positions and are brought into contact with outer peripheral surfaces of spring holders 52h, 53h of the lost motion mechanisms 52, 53 mounted in the left and right outer peripheral recessed portions 51a, 51b of the control rod 51 (see FIG. 4).

The cam rod C is an angular columnar rod-like member that has a rectangular cross section and extends in an elongated manner in the axial direction. A cam face is formed on an outer peripheral surface of the cam rod C on a side opposite to an inner peripheral surface, which is brought into contact with the spring holders 52h, 53h. A cam groove v is formed on desired three portions of the cam face and a pair of engaging pawls p is formed on the inner peripheral surface of the cam rod C in a projecting manner such that the engaging pawls P sandwich either one of the spring holders 52h, 53h from left and right sides.

With respect to the odd-numbered cam rods Cao, Cbo where the cam grooves v1, v3, v5 are formed on three portions corresponding to the odd-numbered gears (the first, third and fifth driven shift gears n1, n3, n5), there are two kinds of cam rods, that is, the cam rod for normal rotation (a rotational direction where a force is applied to the counter gear shaft 12 from the driven shift gear n at the time of acceleration) and the cam rod for reverse rotation (a rotational direction where a force is applied to the counter gear shaft 12 from the driven shift gear n at the time of deceleration). Here, one odd-numbered cam rod Cao for normal rotation has the engaging pawls p, which are engaged with the right spring holder 53h on the inner peripheral surface thereof, and the other odd-numbered cam rod Cbo for reverse rotation has engaging pawls p, which are engaged with the left spring holder 52h on the inner peripheral surface thereof (see FIG. 4).

In the same manner, with respect to the even-numbered cam rods Cae, Cbe where the cam grooves v2, v4, v6 are formed on three portions corresponding to the even-numbered gears (the second, fourth and sixth driven shift gears n2, n4, n6), there are two kinds of cam rods, that is, the cam rod for normal rotation and the cam rod for reverse rotation. Here, one even-numbered cam rod Cae for normal rotation has the engaging pawls p, which are engaged with the left spring holder 52h on the inner peripheral surface thereof, and the other even-numbered cam rod Cbe for reverse rotation has the engaging pawls p, which are engaged with the right spring holder 53h on the inner peripheral surface thereof (see FIG. 4).

Accordingly, along with the movement of the control rod 51 in the axial direction, the odd-numbered cam rod Cao for normal rotation and the even-numbered cam rod Cbe for reverse rotation are moved axially in an interlocking manner together with the spring holder 53h by way of the compression coil spring 53s of the right lost motion mechanism 53, and the odd-numbered cam rod Cbo for reverse rotation and the even-numbered cam rod Cae for normal rotation are moved axially in an interlocking manner together with the spring holder 52h by way of the coil spring 52s of the left lost motion mechanism 52.

In this manner, along with the movement of the control rod 51 in the axial direction, the cam rods C are axially moved in an interlocking manner by way of the lost motion mechanisms 52, 53, and the movement of the cam rods C makes the respective driven shift gears n selectively engage with the counter gear shaft 12 by the engaging means 20 assembled into the counter gear shaft 12 so that the gear shift is performed.

Figure 3:
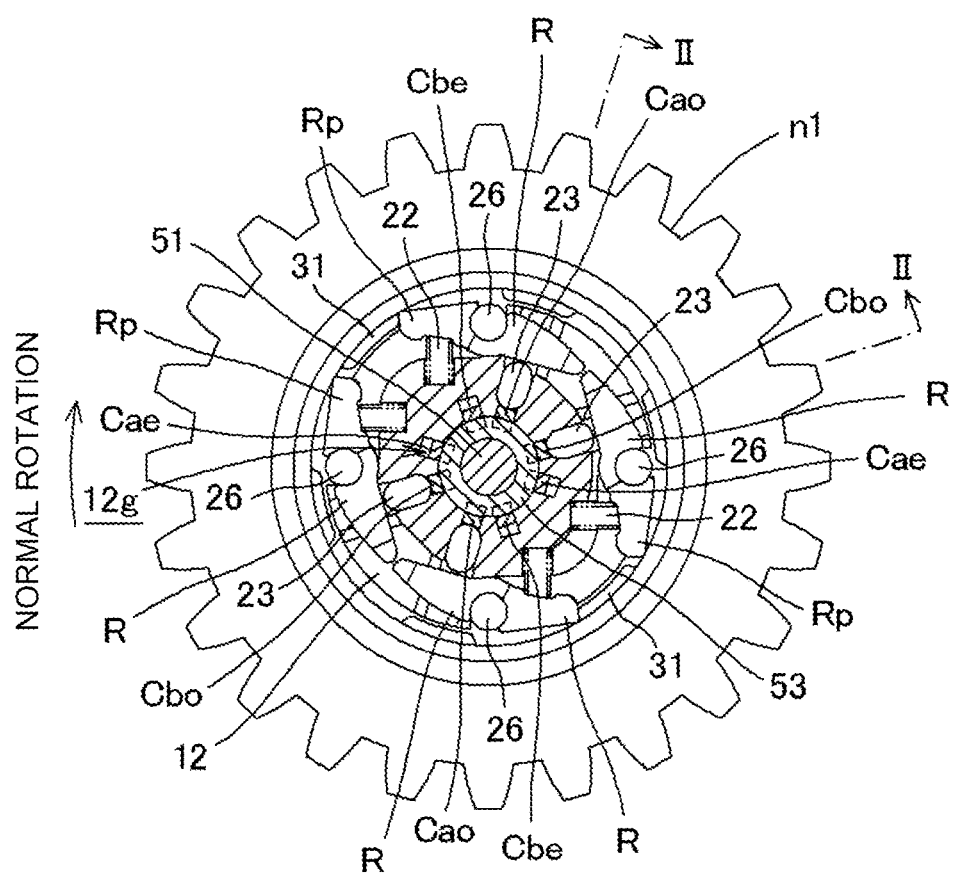
FIG. 3 is a cross-sectional view taken along a line III-III in FIG. 2.

To explain the engaging device 20 in conjunction with FIG. 3, tilting pawl members R are tiltably and pivotally supported by support shaft pins 26 respectively along an inner periphery of the driven shift gear n, and one end of the tilting pawl member R is pushed by a compression spring 22 and a pin member 23 is brought into contact with the other end of the tilting pawl member R. When the pin member 23 falls in any one of cam grooves v formed on the moving cam rod C, the tilting pawl member R is tilted by the compression spring 22, and a projecting engaging pawl portion Rp engages with the engaging projecting portion 31 formed on the inner periphery of the driven shift gear n of corresponding gear speed so that the rotation of the driven shift gear n can be transmitted to the counter gear shaft 12.

In a shift-up operation, the shift-up operation is performed in such a manner that in a state where the driven shift gear n is engaged with the tilting pawl member R, another driven shift gear n whose reduction ratio is smaller than a reduction ratio of the former driven shift gear n by one stage engages with the tilting pawl member R and hence, the mechanism is smoothly operated without requiring a force in the engagement and the release of the engagement, and a clutch for gear shift is unnecessary. Further, there is no loss time in a changeover time at the time of performing the shift-up operation, there is no leakage of the drive force and, further, a gear shift shock is also small and hence, the smooth shift-up operation can be performed.

Also in a shift-down operation, the shift-down operation is performed in such a manner that in a state where the driven shift gear n is engaged with the tilting pawl member R, the tilting pawl member R engages with another driven shift gear n whose reduction ratio is larger than a reduction ratio of the former driven shift gear n by one stage and hence, the mechanism is smoothly operated without requiring a force in the engagement and the release of the engagement, and a clutch for gear shift is unnecessary. Further, there is no loss time in a changeover time at the time of performing the shift-down operation, there is no leakage of the drive force and, further, a gear shift shock is also small and hence, the smooth shift-down operation can be performed.

As described above, the multi-speed transmission of this embodiment is a special constant-meshing-type multi-speed transmission where the control rod 51, which moves axially in the inside of the counter gear shaft 12, selectively operates the engaging members 20 arranged in the inside of the counter gear shaft 12 so as to make the desired driven shift gear n engage with the counter gear shaft 12 thus establishing a gear speed.

In such a special constant-meshing-type multi-speed transmission, as shown in FIG. 4, a control rod operator 55 having a cylindrical shape is mounted on a right end portion of the control rod 51 which is arranged on a right side of the nut portion 51c by way of ball bearings 56, which are fitted in the inside of the control rod operator 55.

The ball bearings 56 are two ball bearings connected to each other in the axial direction, are fitted on the right end portion of the control rod 51, which is arranged on the right side of the nut portion 51c, and are fastened between the nut portion 51c and a nut 57, which is threadedly engaged with a male threaded end portion 51bb, in a sandwiched manner. Accordingly, the control rod operator 55 rotatably holds the right end portion of the control rod 51.

A pin hole 55h is formed in a cylindrical portion of the control rod operator 55, which extends toward a right side from the threadedly engaged nut 57 in a state where the pin hole 55h is formed in the diametrical direction, and a shift pin 58 passes through the pin hole 55h. The control rod 51 is moved in the axial direction by way of the shift pin 58.

Figure 5:
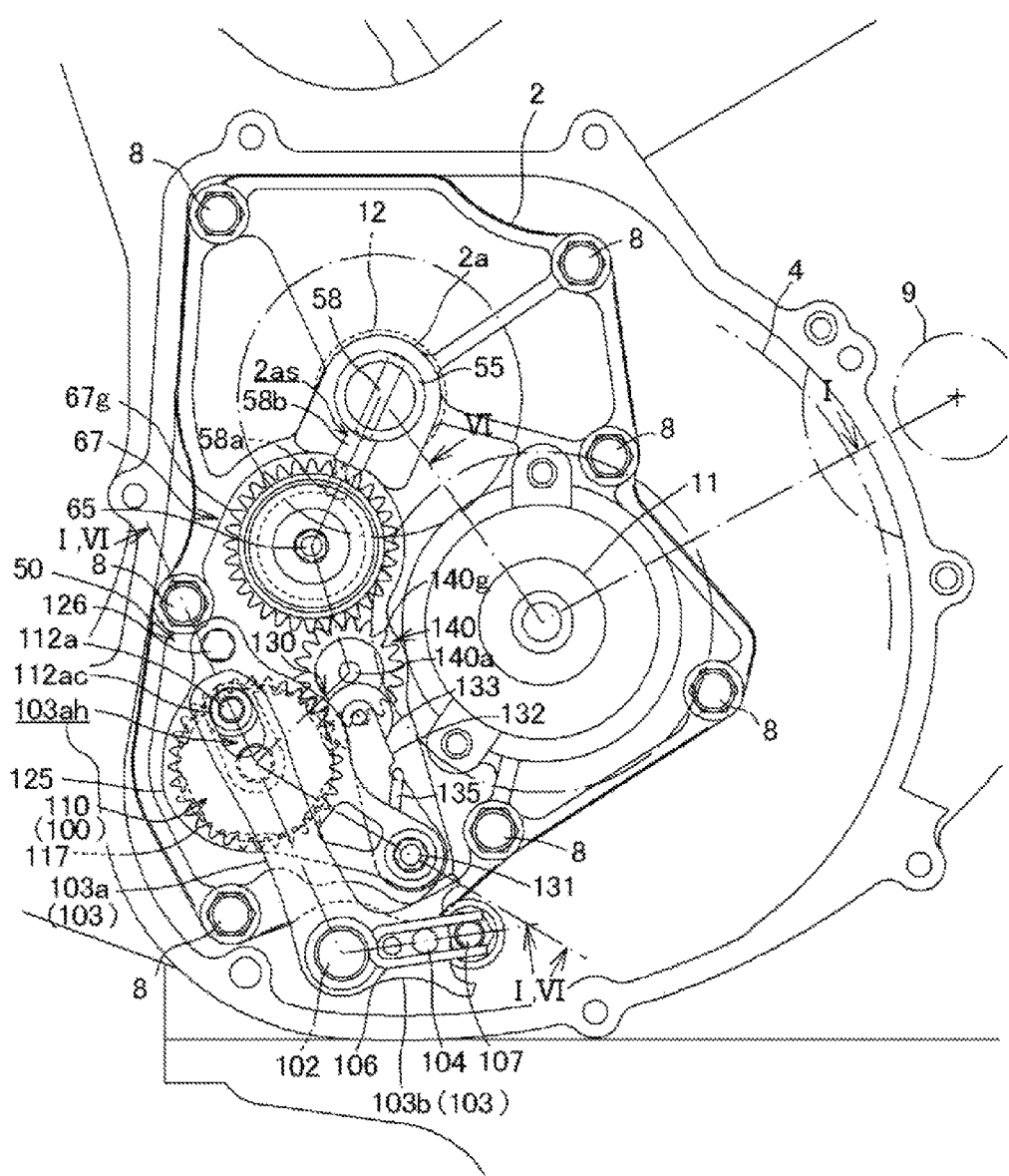
FIG. 5 is a right side view showing a shift drive mechanism of a power unit.

On the other hand, as shown in FIG. 5, a shift spindle 102 is transversely mounted below the holder side wall member 2 in a state where the shift spindle 102 penetrates the left and right engine cases 1L, 1R in the lateral horizontal direction. The counter gear shaft 12 on an upper side and the shift spindle 102 on a lower side are relatively largely spaced apart from each other, and the left engine case 1L, which rotatably supports the counter gear shaft 12 and the shift spindle 102, which are spaced apart from each other, corresponds to a transmission case of a constant-meshing-type multi transmission of a general type, which performs a gear shift in such a manner that a shift fork moves a shifter gear provided with a dog clutch mechanism and a shifter in the axial direction.

A proximal end of a pedal link arm member 101 is mounted on a left end portion of the shift spindle 102, which penetrates the left engine case 1L by fitting, and the pedal link arm member 101 is connected with a shift pedal (not shown) by way of a link rod so that an operation of the shift pedal is transmitted as the rotation of the shift spindle 102.

Accordingly, a shift drive mechanism 50 is a mechanism that transmits the rotation of the shift spindle 102 brought about by an operation of the shift pedal as the movement of the control rod 51 in the axial direction. The shift drive mechanism 50 is mounted on the holder side wall member 2 of the right engine case 1R.

Hereinafter, the shift drive mechanism 50 is explained in conjunction with FIG. 5 to FIG. 6.

The holder side wall member 2 on which the shift drive mechanism 50 is mounted is fitted in an opening having a predetermined shape, which is formed on the side wall of the right engine case 1R such that the holder side wall member 2 closes the opening, and a periphery of the holder side wall member 2 is fastened to the right engine case 1R using a plurality of bolts 8 (see FIG. 5).

As shown in FIG. 5, the holder side wall member 2 is positioned behind the crankshaft 9 and, as explained previously, the right side portions of the main gear shaft 11 and the counter gear shaft 12 are rotatably supported on the holder side wall member 2 by way of the bearings 3R, 7R respectively.

To explain the structure in conjunction with FIG. 5, the main gear shaft 11 is positioned at an approximately intermediate height of the holder side wall member 2 in the vertical direction in an offset manner toward a front side such that the main gear shaft 11 is arranged close to the crankshaft 9 arranged on a front side.

The counter gear shaft 12 is positioned at an oblique upper rear side as viewed from the main gear shaft 11.

A guide sleeve portion 2a, which has a deformed cylindrical shape and projects rightward is formed on an extension portion of the holder side wall member 2, which extends from the counter gear shaft 12, and a slit 2, which extends in the lateral direction in an elongated manner, is formed in the guide sleeve portion 2a by partially cutting out an oblique downward and rearward extending portion of the guide sleeve portion 2a.

The control rod operator 55, which rotatably holds the right end portion of the control rod 51, which passes through the inside of the counter gear shaft 12, is slidably inserted into the guide sleeve portion 2a, and a projecting portion of the shift pin 58, which penetrates the control rod operator 55 in the diametral direction passes through the slit 2 as.

A portion of the shift pin 58, which projects from the control rod operator 55 and passes through the slit 2 as forms a slide portion 58b having a rectangular parallelepiped shape, and a circular columnar engaging portion 58a, is formed on the shift pin 58 in a projecting manner from the slide portion 58b.

Since the slide portion 58b of the shift pin 58 is slidably fitted in the slit 2 as formed in the guide sleeve portion 2a, the rotation of the control rod operator 55 is restricted together with the shift pin 58, and the control rod operator 55 slides only in the lateral axis direction.

A shift drum 67 is provided on a slit 2 as side along the guide sleeve portion 2a of the holder side wall member 2.

A shift guide groove 67v is formed on an outer peripheral surface of the cylindrical portion of the shift drum 67 such that a spiral is drawn over approximately one turn.

Figure 7A:
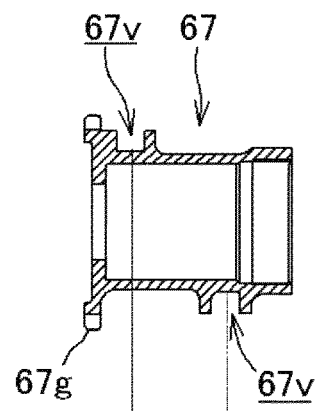
FIG. 7A is a cross-sectional view of a shift drum and FIG. 7B is a developed view of an outer peripheral surface of the shift drum.
Figure 7B:
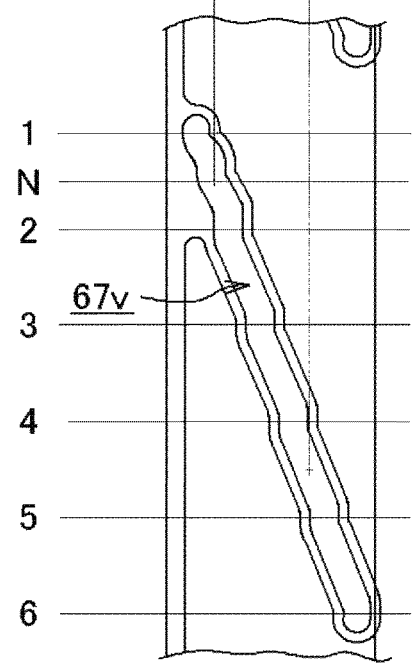

As shown in FIG. 7B where an outer peripheral surface of the cylindrical portion of the shift drum 67 is shown in a developed manner, a return type gear shift method is provided where respective gear speed positions from the first speed position to the sixth speed position are formed for every predetermined rotational angle (for example, 60 degrees), and a neutral position is formed between the first speed position and the second speed position in such gear speed positions.

A drum-side driven gear 67g is formed on an end portion of the cylindrical portion of the shift drum 67 by enlarging a diameter of the end portion in a flange shape.

The shift drum 67 is rotatably supported on the holder side wall member 2 adjacent to a slit 2 as side of the guide sleeve portion 2a of the holder side wall member 2.

Bearings 66 are fitted in the inside of the cylindrical portion of the shift drum 67, the shift drum 67 is rotatably supported on a support shaft 65, which passes through a small hole formed in the holder side wall member 2 from the inside (left side) and projects toward the outside (right side), by way of the bearings 66, and a nut 68 is threadedly engaged with a threaded portion formed on an end portion of the support shaft 65 projecting from the bearing 66 by way of a washer 68w so that the shift drum 67 is rotatably mounted on the holder side wall member 2.

The engaging portion 58a of the shift pin 58, which projects from the slit 2 as formed in the guide sleeve portion 2a, is slidably fitted into the shift guide groove 67v formed on the shift drum 67.

Accordingly, the rotation of the shift drum 67 moves the shift pin 58 fitted into the shift guide groove 67v in the axial direction together with the control rod operator 55.

The control rod operator 55 rotatably holds the right end portion of the control rod 51 and hence, the rotation of the shift drum 67 eventually moves the control rod 51 in the axial direction.

A first speed state shown in FIG. 2 and FIG. 3 is established when the control rod 51 is positioned at the leftmost side in the axial direction with respect to the counter gear shaft 12. Each time the control rod 51 moves toward a right side in the axial direction sequentially from the first speed state, a neutral state, a second speed state, a third speed state, a fourth speed state, a fifth speed state, and a sixth speed state are established.

The control rod 51 moves on a hollow-shaft center axis Z of the counter gear shaft 12, a left distal end portion 51e of the control rod 51 faces and is insertable into an insertion hole 85h formed in a bottomed cylindrical member 85, which is press-fitted into an inner periphery of a left end portion of the counter gear shaft 12, thus constituting a neutral position determining mechanism 80, described later.

In a special constant-meshing-type multi-speed transmission of this embodiment, as described above, the shift drum 67 is provided in the vicinity of the counter gear shaft 12, which is rotatably supported on an upper portion of the holder side wall member 2.

In this manner, the power transmission between the shift drive mechanism 50 connects the shift drum 67 provided in the vicinity of the right end of the counter gear shaft 12 rotatably supported on the upper portion of the holder side wall member 2 and the shift spindle 102, which is rotatably supported on the right engine case 1R arranged below the holder side wall member 2, which are relatively largely spaced apart from each other, is made by connecting them by the shift drive mechanism 50 on the holder side wall member 2.

A proximal end of a shift arm 103 is fitted on a portion of the shift spindle 102, which penetrates the right engine case 1R. A long portion 103a and a short portion 103b extend from the proximal end of the shift arm 103, an elongated hole 103ah is formed in a distal end portion of the long portion 103a, and a mounting hole 103bh is formed in a distal end portion of the short portion 103b. An engaging bolt 104 passes through the mounting hole 103bh, and a nut 104n is threadedly engaged with the engaging bolt 104 so that the engaging bolt 104 is fixedly mounted on the shift arm 103.

A coil portion of a return coil spring 106 is wound around a right end of the shift arm 103, and the removal of the return coil spring 106 is prevented by a cap member 105.

On the other hand, a stopper pin 107 is fixedly mounted on the right engine case 1R on a side of the short portion 103b.

The return coil spring 106 is set such that both end portions extending from the coil portion sandwich the engaging bolt 104 and the stopper pin 107, and the return coil spring 106 holds the shift arm 103 at a neutral position (see FIG. 5), and maintains the shift pedal at a neutral position by way of the shift spindle 102.

Accordingly, when the shift spindle 102 is rotated due to a step-in operation or a loosening operation of the shift pedal by way of a link, the shift arm 103 is tilted integrally with the shift spindle 102 against the return coil spring 106 and hence, when an operating force of the shift pedal is released, the shift arm 103 is returned to the neutral position together with the shift spindle 102 due to a biasing force of the return coil spring 106.

An intermittent drive mechanism 100, which intermittently rotates the shift drum 67 for every position of each gear speed by transmitting the reciprocating rotation of the shift spindle 102, is arranged between the shift spindle 102 and the shift drum 67 (see FIG. 5).

As shown in FIG. 5, the intermittent drive mechanism 100 is arranged close to a rear side of a lower portion of the holder side wall member 2.

Figure 6:
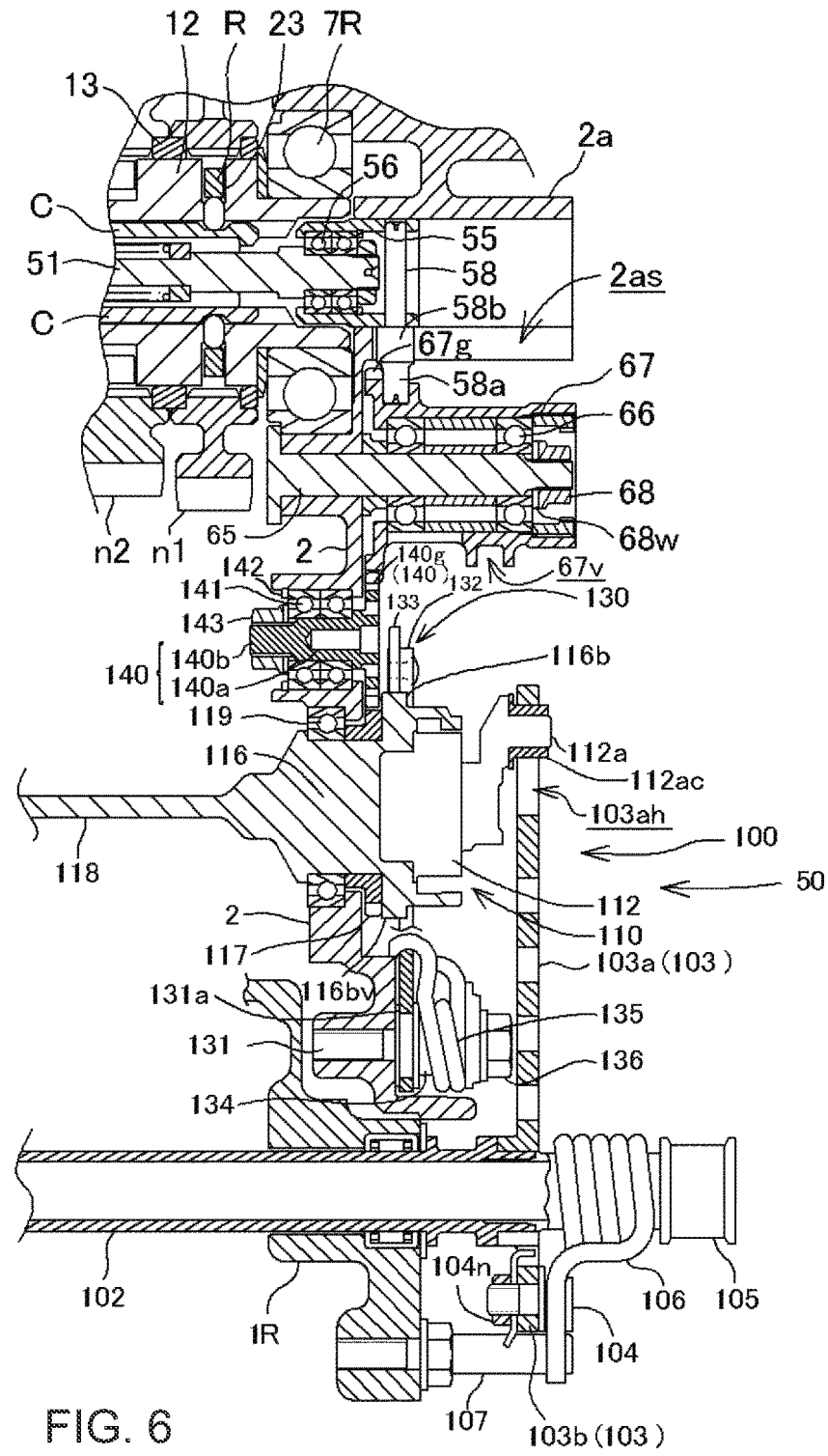
FIG. 6 is a cross-sectional view taken along a line VI-VI in FIG. 5.

The intermittent drive mechanism 100 is formed by combining an upstream-side rotary member 112 and a downstream-side rotary member 116 in a relatively rotatable manner, and is rotatably supported on the holder side wall member 2 by way of a bearing 119 (see FIG. 6).

A cylindrical collar 112ac is mounted on a periphery of a projection 112a formed on the upstream-side rotary member 112, and the cylindrical collar 112ac is slidably fitted in the elongated hole 103ah formed in the distal end of the long portion 103a of the shift arm 103. The tilting of the shift arm 103 is transmitted as the rotation of the upstream-side rotary member 112 by way of the projection 112a.

A flower-shaped cam portion 116b is formed on an outer peripheral surface of a cylindrical portion of the downstream-side rotary member 116 in which a part of the upstream-side rotary member 112 is inserted, wherein the flower-shaped cam portion 116b has a predetermined uneven cam surface 116bv on which detent recessed portions corresponding to respective gear speeds consisting of the first speed, the neutral, the second speed, the third speed, the fourth speed, the fifth speed and the sixth speed are sequentially formed.

A downstream-member-side drive gear 117 is provided on an outer periphery of the downstream-side rotary member 116, and a connecting rod portion 118 extends toward a side opposite to the upstream-side rotary member 112 (see FIG. 1, FIG. 6).

A left joining end portion 118l of the connecting rod portion 118 is rotatably supported on the left engine case 1L by way of a bearing 120, and is joined to an operating shaft 121a of a gear position sensor 121 mounted on the engine case 1L (see FIG. 1).

A special pivotal shaft bolt 131, which has threaded portions thereof formed on both sides of a center flange 131a, is mounted on a lower portion of the holder side wall member 2 in a projecting manner toward the outside in a state where one threaded portion is threadedly engaged with the lower portion of the holder side wall member 2 (see FIG. 5, FIG. 6), a proximal end of a detent arm 132 of a detent mechanism 130 is rotatably supported on the projecting other threaded portion, a flanged collar 134 is fitted on the special pivotal shaft bolt 131, a coil spring 135 is wound around the flanged collar 134, the special pivotal shaft bolt 131 is inserted into the mounting hole formed in a long portion 125c of a guide plate 125 which extends downward, and a nut 136 is threadedly engaged with the threaded portion of the special pivotal shaft bolt 131, which further extends from the flanged collar 134 (see FIG. 7) thus fixing the long portion 125c of the guide plate 125, which extends downward and pivotally supporting the detent arm 132 of the detent mechanism 130 (see FIG. 6).

A roller 133 is rotatably and pivotally supported on a distal end of the detent arm 132 of the detent mechanism 130, the coil spring 135, which has one end thereof engaged with the fixed portion, has the other end thereof engaged with the detent arm 132 thus tiltably biasing the detent arm 132, and the roller 133 mounted on the distal end of the detent arm 132 is pushed to the predetermined uneven cam surface 116bv of the flower-shaped cam portions 116b of the downstream-side rotary member 116 where the detent recessed portions are sequentially formed thus constituting the detent mechanism 130.

That is, in the detent mechanism 130, by pushing the roller 133 to the uneven cam surface 116bv of the flower-shaped cam portion 116b of the downstream-side rotary member 116, the roller 133 falls into the detent recessed portions corresponding to the respective gear speeds from the first speed, the neutral, the second speed, the third speed, the fourth speed, the fifth speed and the sixth speed so that the detent mechanism 130 can position and stably hold the downstream-side rotary member 116 at a rotary angle of desired gear speed.

The intermittent drive mechanism 100 has such a detent mechanism 130.

An intermediate gear 140 is interposed between the downstream-member-side drive gear 117 of the downstream-side rotary member 116 and the drum-side driven gear 67g of the shift drum 67.

The intermediate gear 140 is formed in a bolt shape where a flattened head portion having an enlarged diameter is formed on an intermediate shaft portion 140a, a teeth portion 140g is formed on an outer periphery of the flattened head portion, and a threaded portion 140b is formed on a distal end of the intermediate shaft portion 140a (see FIG. 6).

To explain the structure in conjunction with FIG. 5 and FIG. 6, the intermediate gear 140 is inserted into a bearing portion of the holder side wall member 2 on a side closer to a front side between the downstream-member-side drive gear 117 and the drum-side driven gear 67g arranged above the downstream-member-side drive gear 117 in a state where the intermediate gear 140 is inserted from the outside (right side), and two bearings 141, 141 are inserted into the bearing portion from the inside (left side). Hence, the intermediate gear 140 is rotatably supported on the bearing portion of the holder side wall member 2 by way of the bearings 141, 141.

A C-shaped retainer 142 is inserted into the bearing portion from the inside (left side) and is engaged with a stepped portion formed on an inner peripheral surface of the bearing portion, thus preventing the removal of the bearings 141, 141. A nut 143 is threadedly engaged with the threaded portion 140b formed on the distal end of the intermediate shaft portion 140a of the intermediate gear 140 by way of a washer, and inner races of the bearings 141, 141 are fastened by being sandwiched between the intermediate gear and the nut 143 thus rotatably mounting the intermediate gear 140.

The teeth portion 140g of the intermediate gear 140 is meshed with the downstream-member-side drive gear 117, and also is meshed with the drum-side driven gear 67g of the shift drum 67 and, hence, the rotation of the downstream-side rotary member 116 of the intermittent drive mechanism 100 is transmitted as the rotation of the shift drum 67 by way of the intermediate gear 140.

The intermediate gear 140 is formed in a bolt shape where the flattened head portion having an enlarged diameter is formed on the intermediate shaft portion 140a, and the intermediate shaft portion 140a is rotatably supported by way of the bearings 141, 141 and, hence, the intermediate gear 140 can be arranged in a compact manner thus realizing the reduction in weight.

The intermittent drive mechanism 100 transmits power to the downstream-side rotary member 116 only during the outgoing rotation with respect to the reciprocating rotation of the upstream-side rotary member 112, which is brought about by the reciprocating tilting of the shift arm 103 and, hence, the downstream-side rotary member 116 is intermittently rotated every time the gear speed is changed over thus realizing the gear shift.

With respect to the shift pedal operation, the loosening operation is performed in the same manner as the step-in operation. Although the rotational directions of the shift arm 103, the upstream-side rotary member 112 and the downstream-side rotary member 116 in the loosening operation become opposite to the corresponding rotational directions in the step-in operation, the downstream-side rotary member 116 is intermittently rotated, and the moving direction of the control rod 51 becomes opposite.

That is, when either one of the step-in shift pedal operation or the loosening shift pedal operation is performed, the shift spindle 102 is rotated so that the shift arm 103 is tilted integrally with the shift spindle 102. The upstream-side rotary member 112 is rotated by way of the engagement between the elongated hole 103h and the projection 112a. The downstream-side rotary member 116, which is rotated by way of the intermittent drive mechanism 100, is held at a desired rotational position in a stable manner by the flower-shaped cam 116b and the detent mechanism 130. The rotation of the downstream-side rotary member 116 during such a period rotates the shift drum 67 by a predetermined amount by way of the intermediate gear 140 so that the control rod 51 moves in the axial direction by a predetermined amount by way of the shift pin 58 guided by the shift guide groove 67v, thus changing over the gear speed.

The intermittent drive mechanism 100 includes the detent mechanism 130, which positions and holds the flower-shaped cam 116b at the predetermined rotational position together with the downstream-side rotary member 116 when the roller 133 is pushed and hence, the rotation of the shift spindle 102 can be intermittently transmitted to the shift drum 67 thus reliably positioning the shift drum 67 for every gear speed.

The gear position sensor 121 is arranged on the left engine case 1L having a margin in space compared to the holder side wall member 2, and the downstream-side rotary member 116, which includes the flower-shaped cam 116b of the detent mechanism 130 for determining the rotational position of the shift drum 67 by surely performing the intermittent driving, is connected to the gear position sensor 121 by way of the connecting rod portion 118. Accordingly, the rotation of the downstream-side rotary member 116, which is integrally provided with the flower-shaped cam 116b operates the gear position sensor 121 by way of the connecting rod portion 118, which is integrally joined to the downstream-side rotary member 116 and hence, the gear position can be properly and accurately detected.

As has been described above, the intermittent drive mechanism 100, which intermittently transmits the rotation of the shift spindle 102 to the shift drum 67 for every gear speed, is arranged between the shift spindle 102 and the shift drum 67 and, hence, the shift spindle 102 and the shift drum 67 can be properly spaced apart from each other. Accordingly, the special constant-meshing-type multi-speed transmission 10 of this embodiment where the control rod 51 and the engaging means 20 are arranged in the inside of the counter gear shaft 12 and the shift drum 67 is arranged in the vicinity of the periphery of the counter gear shaft 12 can be easily applied to the left engine case 1L corresponding to a transmission case of a constant-meshing-type multi-speed transmission of a general type where the counter gear shaft 12 on an upper side and the shift spindle 102 on a lower side are rotatably supported in a largely mutually spaced-apart manner.

The special constant-meshing-type multi speed transmission 10 of this embodiment can be applied to the transmission case of the constant-meshing-type multi-speed transmission of a general type and hence, the transmission case can be used as it is without changing the constitution of a vehicle and thereby manufacturing cost can be largely decreased.

Further, the intermediate gear 140 is interposed between the downstream-member-side drive gear 117 and the drum-side driven gear 67g and hence, the degree of freedom in positions where the downstream-side rotary member 116, which is integrally formed with the downstream-member-side drive gear 117 and the intermittent drive mechanism 100, are arranged is increased whereby the shift spindle 102 and the shift drum 67 can be more easily arranged also in the transmission case of a general type where the shift spindle 102 and the counter gear shaft 12 are rotatably supported in a relatively largely spaced-apart manner.

In the flower-shaped cam 116b of the detent mechanism 130, the predetermined uneven cam surface 116bv on which the detent recessed portions corresponding to the respective gear speeds consisting of the first speed, the neutral, the second speed, the third speed, the fourth speed, the fifth speed and the sixth speed are sequentially formed is formed on the outer periphery of the flower-shaped cam 116b, and the roller 133, which is pushed toward the uneven cam surface 116bv, falls in the detent recessed portions. Accordingly, the downstream-side rotary member 116 is positioned and is held in a stable manner together with the flower-shaped cam 116b. However, to perform the smooth gear shift from the first speed to the second speed at the time of acceleration, the detent recessed portion corresponding to the neutral is shallower in depth than the detent recessed portions corresponding to other gear speeds and hence, a force for holding the downstream-side rotary member 116 in a stable manner is weak.

Accordingly, conventionally, when the gear speed is changed to the neutral by a shift pedal operation, to prevent the gear speed from being changed over to the second speed by skipping the neutral, it is necessary to stop the gear speed at the neutral by slightly loosening the shift pedal from the first speed. On the other hand, when the loosening operation is excessively large, there arises a possibility that the control rod 51 passes the neutral position and is moved to the second speed position.

Accordingly, in the multi speed transmission 10 of this embodiment, the neutral positioning mechanism 80, which can surely position the control rod 51 at the neutral position, is mounted on the inner periphery of the left end portion of the counter gear shaft 12.

To explain the structure in conjunction with FIG. 2, the bottomed cylindrical member 85 is press-fitted in the inner periphery of the left end portion of the counter gear shaft 12 from the left side, and is fixed at a predetermined position.

The insertion hole 85h formed in the bottomed cylindrical member 85 is directed rightward and, from the left side of the counter gear shaft 12, the bottomed cylindrical member 85 is press-fitted to a position approximately in the vicinity of a fitting position of the output sprocket 32 considerably in front of a supply fuel introducing hole 12x formed in the counter gear shaft 12 in the axial direction.

An inner diameter of the insertion hole 85h formed in the bottomed cylindrical member 85 is approximately equal to an outer diameter of the control rod 51 (also an outer diameter of the distal end portion 51e), and the distal end portion 51e of the control rod 51 faces and is insertable into the insertion hole 85h.

Three guide holes 86 are formed in a peripheral wall of the bottomed cylindrical member 85 around the insertion hole 85h at equal intervals in the circumferential direction such that the guide holes 86 extend from the insertion hole 85h in the oblique radial direction.

Three guide holes 86 are formed such that the guide holes 86 extend in the direction which makes an acute inclination angle with respect to the insertion direction of the control rod 51 into the insertion hole 85h.

The guide hole 86 is formed by machining at a predetermined inclination angle from an outer peripheral side of the bottomed cylindrical member 85 by a drill such that a shape of a machined end is formed in a semispherical surface. Here, hole forming by the drill is stopped when a blade portion formed on a distal end of the drill, which obliquely cuts into the bottomed cylindrical member 85, reaches the insertion hole 85h, which is a stage just before the guide hole 86 completely reaches the insertion hole 85h except for a portion of the blade portion. Accordingly, the inner diameter of the guide hole 86 is narrowed in the vicinity of the inner opening leading to the insertion hole 85h so that a narrowed opening edge portion is formed. The inner diameter of the inner opening edge portion of the guide hole 86 is smaller than the inner diameter of the guide hole 86, and also is smaller than an outer diameter of a ball 81 inserted into the guide hole 86.

An outside opening of the guide hole 86 is closed by an inner peripheral surface of the counter gear shaft 12.

The balls 81, which respectively constitute engaging members, are movably inserted into these three guide holes 86, respectively.

The ball 81 is a steel ball having a diameter slightly smaller than the inner diameter of the guide hole 86, and is movable in the oblique radial direction by being guided by the guide hole 86.

However, the diameter of the ball 81 is larger than the inner diameter of the opening edge portion of the guide hole 86 leading to the insertion hole 85h and hence, the ball 81 cannot be removed into the insertion hole 85h from the guide hole 86 by being restricted by the opening edge portion whereby the ball 81 is stopped in the guide hole 86 in a state where the ball 81 is fitted in the opening edge portion and a portion of the ball 81 projects into the insertion hole 85h (see the ball 81 indicated by a double dashed chained line shown in FIG. 2).

With respect to three guide holes 86 formed in the bottomed cylindrical member 85, which is rotatable about the horizontal center axis Z where three guide holes 86 are formed in the oblique radial direction from the insertion hole 85h, at least one guide hole 86 is positioned above the insertion hole 85 and hence, when the rotation of the counter gear shaft 12 is stopped, at least one ball 81 moves toward the inside in the radial direction in the guide hole 86 due to a dead weight thereof and has a portion thereof projected into the insertion hole 85h, while when the counter gear shaft 12 is being rotated, all three balls 81 move toward the outside in the radial direction in the guide holes 86 by a centrifugal force and hence, the balls 81 do not project into the insertion hole 85h.

With respect to a left end portion of the control rod 51 inserted into the insertion hole 85h formed in the bottomed cylindrical member 85, an outer peripheral recessed groove 51v having a narrow width is formed in front of a conically pointed distal end portion 51e (see FIG. 2, FIG. 4).

To explain the structure in conjunction with FIG. 2, which shows the neutral positioning mechanism 80 in a first speed state, when the control rod 51 is positioned in a range from the first speed position on the leftmost side to the neutral position on a right side of the first speed position, the left end portion of the control rod 51 is inserted into the insertion hole 85h formed in the bottomed cylindrical member 85 and hence, the outer peripheral recessed groove 51v formed on the control rod 51 faces the inner openings of the guide holes 86.

When the neutral positioning mechanism 80 is in the first speed state shown in FIG. 2 and the vehicle is in a traveling state, the control rod 51 is at the first speed position where the control rod 51 moves to the leftmost side. In this case, the distal end portion 51e of the control rod 51 and the outer peripheral recessed groove 51v are inserted into the insertion hole 85h formed in the bottomed cylindrical member 85, and the inner openings 86i of the guide holes 86 move to a position where the inner openings 86i face a right side portion of the outer peripheral recessed groove 51v, and all balls 81 (indicated by a solid line in FIG. 2), which are respectively inserted into three guide holes 86 formed in the bottomed cylindrical member 85, which is rotated along with the rotation of the counter gear shaft 12, move toward the outside in the radial direction by a centrifugal force and are brought into contact with the inner peripheral surface of the counter gear shaft 12 so that there are no balls 81 that project into the insertion hole 85h from the inner openings 86i.

When the gear speed is shifted up from the first speed traveling state to the second speed, although the control rod 51 moves rightward to the second speed position from the first speed position on the leftmost side through the neutral position, all balls 81 move toward the outside in the radial direction by a centrifugal force and do not project into the insertion hole 85h from the inner openings 86i and hence, there is no possibility that the balls 81 are engaged with the outer peripheral recessed groove 51v formed on the control rod 51 whereby the control rod 51 smoothly moves to the second speed position from the first speed position through the neutral position thus executing the shift-up operation of the gear speed easily.

As described previously, also in the flower-shaped cam 116b of the detent mechanism 130, the recess of the detent recessed portion 116bv corresponding to the neutral is shallow so that a stability holding force is weak whereby the control rod 51 easily passes the neutral.

Also when the gear speed is shifted down from the second speed to the first speed, the control rod 51 can move leftward smoothly without being obstructed by the balls 81.

At the time of shifting up the gear speed to the higher gear speed from the second speed, the control rod 51 moves further rightward. Since the outer peripheral recessed groove 51v formed on the control rod 51 including the distal end portion 51e is removed from the insertion hole 85h formed in the bottomed cylindrical member 85, the shift-up operation is not influenced by the neutral positioning mechanism 80 including the shift-down operation.

In stopping the traveling of a vehicle, at a point of time that the rotation of the counter gear shaft 12 is stopped, the loosening operation of the shift pedal is performed at a level which is approximately one half of a usual gear shift operation so that the control rod 51 moves to the neutral position from the first speed position. On the other hand, when the rotation of the counter gear shaft 12 is stopped with the control rod 51 held at the first speed position, the ball 81 inserted into the guide hole 86 disposed above the insertion hole 85h formed in the bottomed cylindrical member 85 moves toward the inside in the radial direction by a dead weight thereof, and projects into the outer peripheral recessed groove 51v formed on the control rod 51 in a state that a portion of the ball 81 projects into the insertion hole 85h from the inner opening.

Accordingly, when the control rod 51 moves rightward in such a state, a tapered left inner surface of the outer peripheral recessed groove 51v formed on the control rod 51 is brought into contact with a portion of the ball 81 that advances into the outer peripheral recessed groove 51v and pushes the ball 81 to a right-side inclined surface of the guide hole 86 so that the ball 81 is sandwiched between the left inner surface and the right-side inclined surface whereby the control rod 51 is engaged with the ball 81. Accordingly, the movement of the control rod 51 is restricted and hence, the control rod 51 can be easily and surely positioned at the neutral position.

As described previously, in the detent mechanism 130 of the intermittent drive mechanism 100, a force for holding the positioning corresponding to the neutral in a stable manner is weak and hence, there exists a possibility that the gear speed skips the neutral. However, as described above, by stopping the traveling and by performing the loosening operation of the shift pedal at a level that is approximately one half of the usual shift operation, the movement of the control rod 51 is prevented at the neutral position so that the gear speed is surely positioned. Accordingly, it is unnecessary to delicately adjust the shift pedal operation for shifting the gear speed to the neutral and hence, the gear speed can be easily and surely shifted to the neutral.

It is possible to completely prevent the occurrence of a state where the loosening operation of the shift pedal is so large that the control rod 51 passes the neutral position and moves to the second speed position.

When the vehicle starts traveling by starting the internal combustion engine in a state where the control rod 51 is at the neutral position so that the vehicle is stopped, the ball 81, which is inserted into the guide hole 86 arranged above the insertion hole 85h formed in the bottomed cylindrical member 85, advances into the outer peripheral recessed groove 51v formed on the control rod 51. However, the control rod 51 moves leftward and moves to the first speed position by the shift pedal operation and hence, there is no possibility that the ball 81 is engaged with the control rod 51 in a state where the ball 81 advances into and is held in the outer peripheral recessed groove 51v. Accordingly, a gear shift can be performed by smoothly moving the control rod 51 to the first speed position from the neutral position.

After the gear shift is performed by moving the control rod 51 to the first speed position, the traveling of the vehicle can be started by connecting the friction clutch 5.

When the counter gear shaft 12 is rotated by starting the traveling of the vehicle, all balls 81 move toward the outside in the radial direction in the guide holes 86 due to a centrifugal force so that the first speed traveling state shown in FIG. 2 is brought about.

The intermittent drive mechanism 100 of the shift drive mechanism 50 of the multi-speed transmission 10 according to this embodiment includes the shift arm 103, which has the proximal end portion thereof fixedly mounted on the shift spindle 102 and is tilted integrally with the shift spindle 102 in a reciprocating manner, and the upstream-side rotary member 112 is rotated by way of the projection 112a with which the elongated hole 103ah formed in the tilting distal end portion of the shift arm 103 engages. Accordingly, an amount of rotation of the upstream-side rotary member 112 and an amount of rotation of the downstream-side rotary member 116 generated by the tilting of the shift arm 103 are determined so that an intermittent rotational amount of the shift drum 67 to which the rotation is transmitted from the downstream-side rotary member 116 by way of a gear system can be properly determined.

In the shift drive mechanism 50 of the multi-speed transmission 10 according to this embodiment, the shift drum 67 is rotatably supported on the holder side wall member 2, which is detachably mounted on the right transmission case 1R and forms a body separate from the right transmission case 1R, and the upstream-side rotary member 112 and the downstream-side rotary member 116 are coaxially and rotatably supported. Accordingly, a unit is formed by incorporating the shift drum 67 and the intermittent drive mechanism 100 into the holder side wall member 2 so that these parts can be handled integrally, thus enhancing assembling property.

The gear train constituted of the downstream-member-side drive gear 117, the intermediate gear 140 and the drum-side driven gear 67g is arranged along the outer surface of the holder side wall member 2, the flower-shaped cam 116b is arranged outside the downstream-member-side drive gear 117, and the roller 133, which is pushed toward the uneven cam surface 116bv of the flower-shaped cam 116b, is positioned outside and overlaps with the intermediate gear 140. Accordingly, the shift drive mechanism 50 can be constituted in a compact manner.

DESCRIPTION OF REFERENCE NUMERALS AND SIGNS m: drive shift gear, m1 to m6: first to sixth drive shift gears, n: driven shift gear, n1 to n6: first to sixth driven shift gears,
1: engine case (transmission case), 1L: left engine case (left transmission case), 1R: right engine case (right transmission case), 2: holder side wall member,
10: multi-speed transmission, 11: main gear shaft, 12: counter gear shaft,
20: engaging means, C: cam rod, R: tilting pawl member, Rp: engaging pawl portion,
50: shift drive mechanism, 51: control rod, 51e: distal end portion, 51v: outer peripheral recessed groove, 51a, 51b: outer peripheral recessed portion, 52, 53: lost motion mechanism, 55: control rod operator, 58: shift pin, 67: shift drum, 67g: drum-side driven gear, 67v: shift guide groove, 80: neutral positioning mechanism, 81: ball, 85: bottomed cylindrical member, 85h: insertion hole, 86: guide hole, 102: shift spindle, 103: shift arm, 106: return coil spring, 100: intermittent drive mechanism
112: upstream-side rotary member, 112a: projection, 116: downstream-side rotary member, 116b: flower-shaped cam portion, 116bv: uneven cam surface, 117: downstream-member-side drive gear, 118: connecting rod portion, 121: gear position sensor, 125: guide plate,
130: detent mechanism, 132: detent arm, 133: roller,
140: intermediate gear

What is claimed is:

1. A shift drive mechanism of a multi-speed transmission where the transmission is configured such that
   a group of gears formed of a plurality of drive gears and a group of gears formed of a plurality of driven gears are rotatably supported on gear shafts arranged parallel to each other respectively in such a state where the drive gears and the driven gears are meshed with each other for every gear speed,
   one group of gears formed of the plurality of gears out of the group of gears formed of the plurality of drive gears and the group of gears formed of the plurality of driven gears is fixed to one gear shaft, and an engagement changeover mechanism, which changes over the engagement between the other gear shaft and the respective gears for every gear, is provided between the other group of gears formed of the plurality of gears and the other gear shaft, and
   a control rod is movable in the axial direction on a hollow-shaft center axis of the other gear shaft formed in a hollow shape so that the engagement changeover mechanism is driven whereby a gear shift is performed, and
   a shift pin, which is engaged with a shift guide groove formed on an outer periphery of a shift drum arranged in the vicinity of a periphery of the other gear shaft and is guided due to the rotation of the shift drum, moves the control rod in the axial direction, wherein
   an intermittent drive mechanism, which intermittently rotates the shift drum for every position of each gear speed by transmitting the reciprocating rotation of a shift spindle, which is connected to a gear shift operating member, is arranged between the shift spindle and the shift drum,
   wherein the shift drive mechanism includes a shift arm, which has a proximal end portion thereof fixedly mounted on the shift spindle and is tilted integrally with the shift spindle in a reciprocating manner, and a tilting distal end portion of the shift arm rotates an upstream-side rotary member.

2. The shift drive mechanism of a multi-speed transmission according to claim 1, wherein the intermittent drive mechanism, which transmits power only during the outgoing rotation to a downstream-side rotary member with respect to the reciprocating rotation of the upstream-side rotary member, is provided between the shift spindle and the shift drum, and
   the rotation of a downstream-member-side drive gear, which is formed integrally with the downstream-side rotary member, is transmitted to a drum-side driven gear, which is integrally formed on the shift drum due to the meshing of the gears.

3. The shift drive mechanism of a multi-speed transmission according to claim 2, wherein the intermittent drive mechanism includes a detent mechanism where a flower-shaped cam is coaxially and integrally formed with the downstream-side rotary member, and the flower-shaped cam is positioned and held at the predetermined rotational position together with the downstream-side rotary member by pushing a roller by a biasing device toward a predetermined uneven cam surface of the flower-shaped cam where a plurality of detent recessed portions are sequentially formed on the uneven cam surface in a circumferential direction.

4. The shift drive mechanism of a multi-speed transmission according to claim 3, wherein an intermediate gear is interposed between the downstream-member-side drive gear and the drum-side driven gear.

5. The shift drive mechanism of a multi-speed transmission according to claim 4, wherein
   the multi-speed transmission is housed in a transmission case, and
   the shift drum is rotatably supported on a holder side wall member, which is detachably mounted on the transmission case and forms a body separate from the transmission case, and the upstream-side rotary member and the downstream-side rotary member are coaxially and rotatably supported.

6. The shift drive mechanism of a multi-speed transmission according to claim 5, wherein a connecting rod portion, which extends on a rotation center axis from the downstream-side rotary member rotatably supported on the holder side wall member, is coaxially joined to an operating shaft of a gear position sensor mounted on the transmission case.

7. The shift drive mechanism of a multi-speed transmission according to claim 5, wherein the intermediate gear is formed in a bolt shape where a head portion having an enlarged diameter is formed on an intermediate shaft portion, and a teeth portion is formed on an outer periphery of the head portion, and the intermediate shaft portion is rotatably supported on the holder side wall member via a bearing.

8. The shift drive mechanism of a multi-speed transmission according to claim 7, wherein a gear train where the downstream-member-side drive gear, the intermediate gear and the drum-side driven gear are meshed with each other sequentially is arranged along an outer surface of the holder side wall member, the flower-shaped cam is arranged outside the downstream-member-side drive gear in the axial direction, and the roller, which is pushed toward the uneven cam surface of the flower-shaped cam by the biasing device, overlaps with the intermediate gear as viewed in the axial direction.

9. The shift drive mechanism of a multi-speed transmission according to claim 1, wherein the multi-speed transmission is housed in a transmission case, and the shift drum is rotatably supported on a holder side wall member, which is detachably mounted on the transmission case and forms a body separate from the transmission case, and the upstream-side rotary member and a downstream-side rotary member are coaxially and rotatably supported.

10. The shift drive mechanism of a multi-speed transmission according to claim 9, wherein a connecting rod portion, which extends on a rotation center axis from the downstream-side rotary member rotatably supported on the holder side wall member is coaxially joined to an operating shaft of a gear position sensor mounted on the transmission case.

11. The shift drive mechanism of a multi-speed transmission according to claim 9, wherein an intermediate gear interposed between a downstream-member-side drive gear and a drum-side driven gear is formed in a bolt shape where a head portion having an enlarged diameter is formed on an intermediate shaft portion, and a teeth portion is formed on an outer periphery of the head portion, and the intermediate shaft portion is rotatably supported on the holder side wall member via a bearing.

12. The shift drive mechanism of a multi-speed transmission according to claim 11, wherein a gear train where the downstream-member-side drive gear, the intermediate gear and the drum-side driven gear are meshed with each other sequentially is arranged along an outer surface of the holder side wall member, a flower-shaped cam of a detent mechanism of the intermittent drive mechanism is arranged outside the downstream-member-side drive gear in the axial direction, and a roller, which is pushed toward the uneven cam surface of the flower-shaped cam by a biasing device, overlaps with the intermediate gear as viewed in the axial direction.

13. The shift drive mechanism of a multi-speed transmission according to claim 10, wherein an intermediate gear interposed between a downstream-member-side drive gear and a drum-side driven gear is formed in a bolt shape where a head portion having an enlarged diameter is formed on an intermediate shaft portion, and a teeth portion is formed on an outer periphery of the head portion, and the intermediate shaft portion is rotatably supported on the holder side wall member via a bearing.

14. The shift drive mechanism of a multi-speed transmission according to claim 13, wherein a gear train where the downstream-member-side drive gear, the intermediate gear and the drum-side driven gear are meshed with each other sequentially is arranged along an outer surface of the holder side wall member, a flower-shaped cam of a detent mechanism of the intermittent drive mechanism is arranged outside the downstream-member-side drive gear in the axial direction, and a roller, which is pushed toward the uneven cam surface of the flower-shaped cam by a biasing device, overlaps with the intermediate gear as viewed in the axial direction.

15. The shift drive mechanism of a multi-speed transmission according to claim 6, wherein the intermediate gear is formed in a bolt shape where a head portion having an enlarged diameter is formed on an intermediate shaft portion, and a teeth portion is formed on an outer periphery of the head portion, and the intermediate shaft portion is rotatably supported on the holder side wall member via a bearing.

16. The shift drive mechanism of a multi-speed transmission according to claim 15, wherein a gear train where the downstream-member-side drive gear, the intermediate gear and the drum-side driven gear are meshed with each other sequentially is arranged along an outer surface of the holder side wall member, the flower-shaped cam is arranged outside the downstream-member-side drive gear in the axial direction, and the roller, which is pushed toward the uneven cam surface of the flower-shaped cam by the biasing device, overlaps with the intermediate gear as viewed in the axial direction.

* * * * *